UNITED STATES PATENT OFFICE.

HENRY BIZZARRI, OF NEW YORK, N. Y.

PLASTIC MATERIAL.

1,057,921.   Specification of Letters Patent.   Patented Apr. 1, 1913.

No Drawing.   Application filed April 17, 1912.   Serial No. 691,510.

*To all whom it may concern:*

Be it known that I, HENRY BIZZARRI, a subject of the King of Italy, and a resident of the city of New York, borough of Manhattan, in the county and State of New York, have invented a new and Improved Plastic Material, of which the following is a full, clear, and exact description.

The object of the invention is to provide a new and improved plastic material for the formation of the heads, bodies and limbs of dolls, ornaments, statues or other articles for decorative and other purposes, and which is homogeneous throughout, practically indestructible, exceedingly light, not unduly influenced by moisture, heat or cold, and capable of being readily molded into any desired shape and sufficiently soft to permit cutting or chiseling the same or driving nails through it for fastening the article to a wall or other support without danger of splitting or cracking the material.

For the purpose mentioned the plastic material consists of the following ingredients in about the proportions specified:

| | |
|---|---|
| Zinc white | 4 lbs. |
| Ceresin | 6 " |
| Rosin | 9 " |
| Gelatin glue | 12 " |

In the manufacture of the plastic material, the gelatin glue is first washed in cold water, then placed in a kettle containing about one gallon of water so that the gelatin glue, on the heating of the kettle of water, dissolves. Zinc white is dissolved separately in a half gallon of hot water, and then the zinc white is placed into the kettle containing the dissolved glue and the ingredients are all agitated to insure a thorough mixture thereof and until a white mass is formed. The ceresin and rosin are heated separately for about an hour and a half to dissolve, and form a mixture which is gradually poured into the kettle and the contents thereof are continually stirred for about an hour and a half while the kettle is subjected to heat to maintain the mass at or near the boiling point. The mass in the kettle is directly poured into suitable molds to form the desired article.

Owing to the boiling of the ingredients an exceedingly homogeneous mass is obtained which is uniform in texture throughout and is capable of resisting moisture.

The articles produced are practically indestructible, but can be readily cut or chiseled, or nails can be driven through the same for fastening the articles to a wall or other support without danger of splitting or cracking the material.

The gelatin glue is preferably made from selected calf hide stock, and possesses a high viscosity test and is exceedingly flexible and light.

Having thus described my invention, I claim as new and desire to secure by Letters Patent:

The herein described plastic material consisting of the following ingredients in about the proportions specified, namely: zinc white, four pounds; ceresin, six pounds; resin, nine pounds, and gelatin glue, twelve pounds, the said plastic material being homogenous, water-proof, light, and of sufficient softness to permit cutting or chiseling, or driving nails through it without danger of splitting or cracking.

In testimony whereof I have signed my name to this specification in the presence of two subscribing witnesses.

HENRY BIZZARRI.

Witnesses:
  EMANUELE STORACE,
  ANTHONY RAYLI.